United States Patent [19]

Matsunaga et al.

[11] Patent Number: 4,696,099

[45] Date of Patent: Sep. 29, 1987

[54] METHOD OF PRODUCING A MAGNETIC HEAD

[75] Inventors: Hiroshi Matsunaga; Shinichi Morita, both of Tokyo, Japan

[73] Assignee: TEAC Corporation, Musashino, Japan

[21] Appl. No.: 894,799

[22] Filed: Aug. 8, 1986

[30] Foreign Application Priority Data

Aug. 19, 1985 [JP] Japan ................................ 60-181541

[51] Int. Cl.⁴ ............................................. G11B 5/127
[52] U.S. Cl. ........................................ 29/603; 29/418
[58] Field of Search ................................ 29/603, 418

[56] References Cited

U.S. PATENT DOCUMENTS

| | | | |
|---|---|---|---|
| 3,543,396 | 12/1970 | Illig et al. | 29/603 |
| 3,805,291 | 4/1974 | Sakurai | 360/120 |
| 3,807,042 | 4/1974 | Braitberg et al. | 29/603 |
| 3,829,895 | 8/1974 | Tanaka et al. | 360/121 |
| 3,839,784 | 10/1974 | Pierce | 29/603 |
| 4,589,043 | 5/1986 | Grundther | 29/603 |

FOREIGN PATENT DOCUMENTS 4831927  8/1971  Japan .

*Primary Examiner*—P. W. Echols
*Attorney, Agent, or Firm*—Ladas & Parry

[57] ABSTRACT

A method of producing a magnetic head comprises the steps of forming a core assembly, forming a core-shield-spacer assembly by fitting shields and spacers in the core assembly, and forming a head surface by grinding an upper surface of the core-shield-spacer assembly. The core assembly comprises a reference core block having both side surfaces thereof finished with a high accuracy and a pair of side core blocks connected to the respective side surfaces of the reference core block. Write gaps and read gaps of a plurality of channels are all formed in alignment at the side surfaces of the reference core block.

6 Claims, 21 Drawing Figures

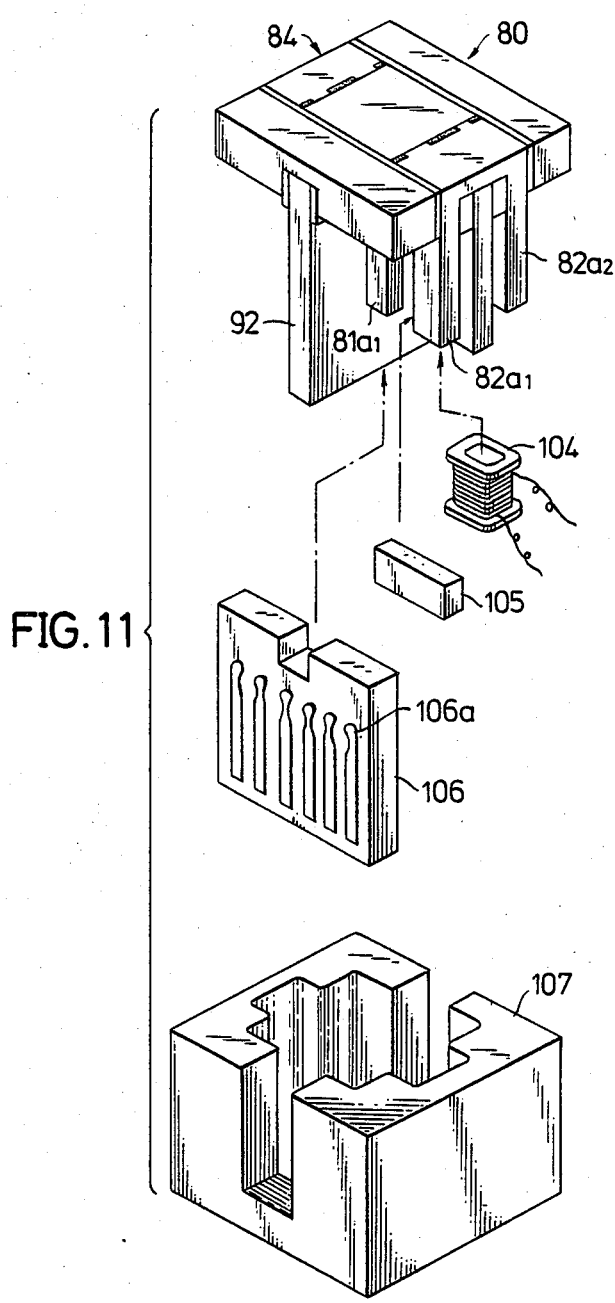

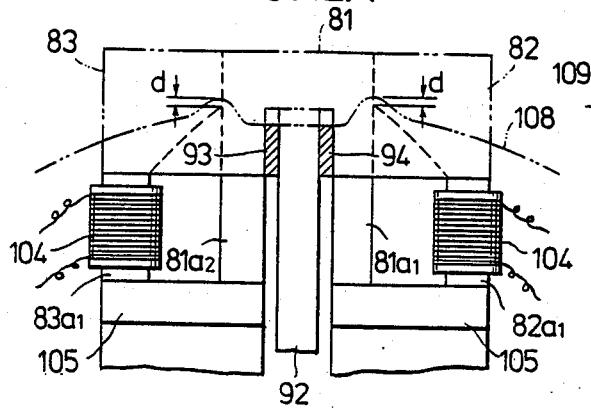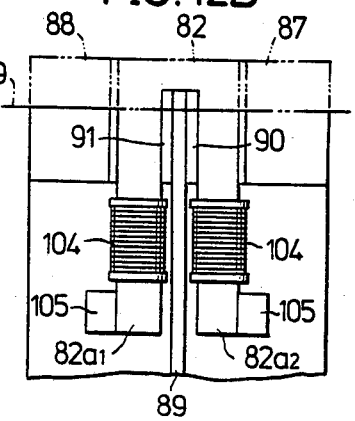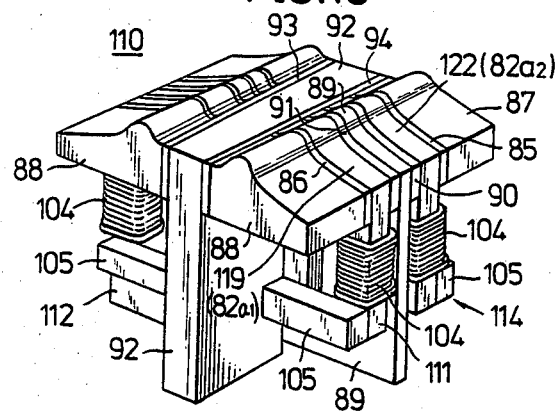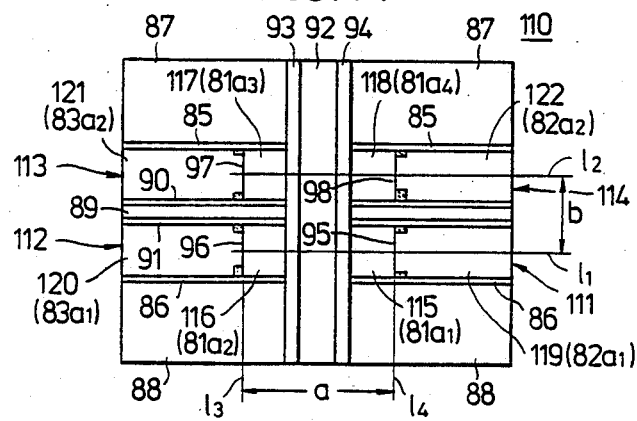

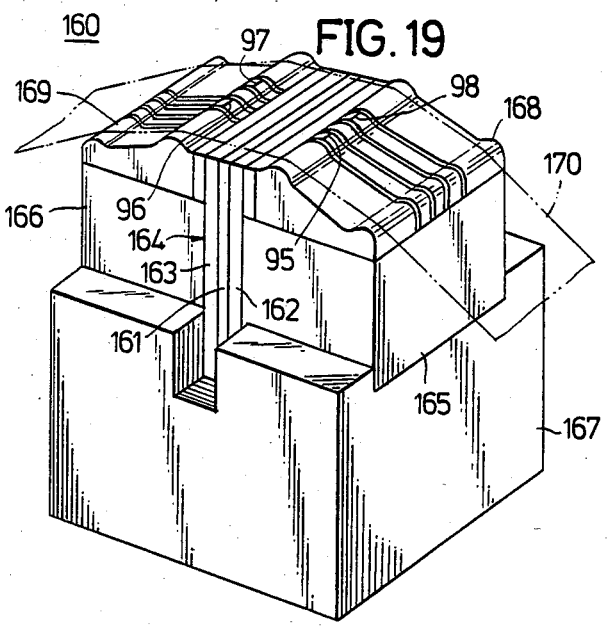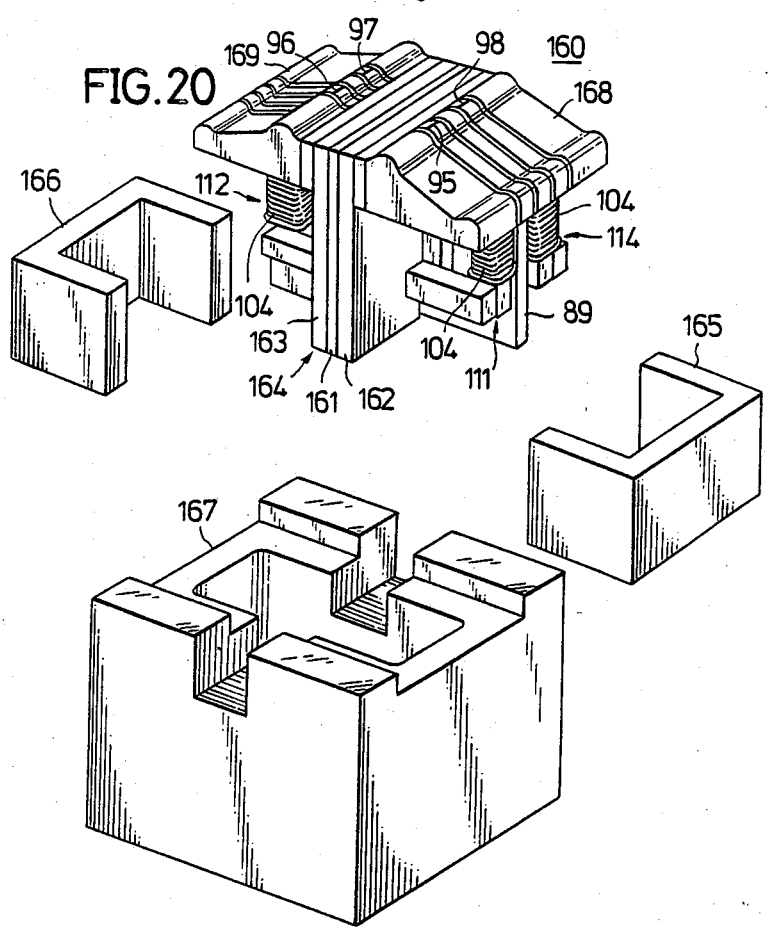

METHOD OF PRODUCING A MAGNETIC HEAD

BACKGROUND OF THE INVENTION

The present invention generally relates to methods of producing magnetic heads, and more particularly to a method of producing a magnetic head which may be used in a cassette tape streaming device.

A cassette tape streaming device records on a cassette tape data which are pre-recorded on a rigid disc so as to function as a back-up system for a rigid disc drive which plays the rigid disc. In a case where the pre-recorded data on the rigid disc are erased erroneously, for example, the cassette tape streaming device is used to transfer the recorded data on a magnetic tape of the cassette tape to the rigid disc drive at a high speed.

In such a cassette tape streaming device, the data are recorded on the magnetic tape according to a group coded recording (GCR) system with a serpentine recording format in which the data are serially recorded on a single continuous track which is formed in a zigzag pattern between the two ends of the magnetic tape.

Since the cassette tape streaming device employs the recording system and the recording format referred to above, a magnetic head of the cassette tape streaming device must have a specific design. That is, a write head and a read head constituting a head pair of a first channel are aligned in a tape transporting direction in which the magnetic tape is transported, and a write head and a read head constituting a head pair of a second channel are aligned in the tape transporting direction. Furthermore, the write head of the first channel and the read head of the second channel are aligned in a direction perpendicular to the tape transporting direction, and the read head of the first channel and the write head of the second channel are aligned in the direction perpendicular to the tape transporting direction.

Such a magnetic head of the cassette tape streaming device must satisfy the following conditions.

(1) Gaps of the write head and the read head of the first channel must be aligned in the tape transporting direction, and gaps of the write head and the read head of the second channel must be aligned in the tape transporting direction.

(2) A distance between the gaps of the write head and the read head of each channel must be accurately set.

(3) A distance between the first and second channels must be accurately set.

(4) The gaps of the write head and the read head which are arranged side by side in the direction perpendicular to the tape transporting direction must be aligned with each other, and the azimuth angle must be accurately equal to 0°.

(5) The degree of parallelism of the gaps of the write head and the read head of each channel must be accurately set.

The conditions (1) through (4) must be satisfied mainly for achieving compatibility among cassette tape streaming devices. The condition (5) must be satisfied for improving the recording density.

As will be described later on in the present specification in conjunction with the drawings, one conventional method of producing the magnetic head produces the magnetic head by independently forming a first channel core assembly constituting the write head and the read head of the first channel and a second channel core assembly constituting the write head and the read head of the second channel, connecting the first and second channel core assemblies with a channel shield interposed therebetween, and grinding an upper surface of the connected core assemblies.

On the other hand, another method of producing the magnetic head produces the magnetic head by independently forming a core assembly constituting the write head of the first channel and the read head of the second channel and a core assembly constituting the read head of the first channel and the write head of the second channel, connecting the two core assemblies with a center shield interposed therebetween, and grinding an upper surface of the connected core assemblies.

According to each of the two conventional methods of producing the magnetic head, the accuracy with which the two core assemblies are connected together with the channel shield or the center shield interposed therebetween, the thickness of the channel shield or the center shield, and the degree of parallelism of both surfaces of the channel shield or the center shield directly affect the positional accuracy of the gaps. As a result, according to the conventional methods of producing the magnetic head, there are many primary factors which affect the positional accuracy of the gaps, and there is a problem in that the methods are unsuited for actual mass production of the magnetic head.

SUMMARY OF THE INVENTION

Accordingly, it is a general object of the present invention to provide a novel and useful method of producing a magnetic head in which the problems described heretofore are eliminated.

Another and more specific object of the present invention is to provide a method of producing a magnetic head comprising the steps of forming a core assembly which comprises as one body a write head and a read head of a first channel and a read head and a write head of a second channel by connecting a first side core block and a second side core block on both side surfaces of a reference core block which has the side surfaces thereof finished with a high accuracy, forming a core-shield-spacer assembly by fitting a center shield and a channel shield in the core assembly, and grinding an upper surface of the core-shield-spacer assembly until the center shield and the channel shield become exposed. According to the method of the present invention, the positional accuracy of gaps of the plurality of write heads and read heads is unaffected by the dimensional accuracy of the channel shield and the center shield and is also unaffected by the fitting of the channel shield and the center shield in the core assembly. For this reason, it is possible to produce the magnetic head by maintaining the positional accuracy of the gaps at the stage of the core assembly. In addition, according to the method of the present invention, it is unnecessary to provide a process of connecting two core assemblies, and it is therefore possible to produce the magnetic head with a reduced number of processes.

Other objects and further features of the present invention will be apparent from the following detailed description when read in conjunction with the accompanying drawings.

BRIEF DESCRIPTION OF THE DRAWINGS

FIG. 11 is a diagram for explaining a process of connecting parts to the core-shield-spacer assembly and fixedly fitting the assembly into a holder;

FIGS. 12A and 12B respectively are diagrams for explaining a process of forming a head surface by grinding an upper surface of the assembly which is fixed in the holder;

FIGS. 13 and 14 are a perspective view and a plan view respectively showing a magnetic head produced by the embodiment of the method of producing the magnetic head according to the present invention with the holder omitted;

FIGS. 19 and 20 are a perspective view and a disassembled perspective view respectively showing a magnetic head produced by another embodiment of the method of producing the magnetic head according to the present invention.

DETAILED DESCRIPTION

First, description will be given with respect to conventional methods of producing a magnetic head.

The magnetic head is conventionally produced by grinding an upper surface of a core-shield-spacer assembly until shields and spacers become exposed. The dimension and degree of parallelism of gaps of write heads and read heads are determined at a stage of the core-shield-spacer assembly, and for this reason, description of the conventional magnetic head will be given hereunder with respect to the core-shield-spacer assembly.

Figure 1:
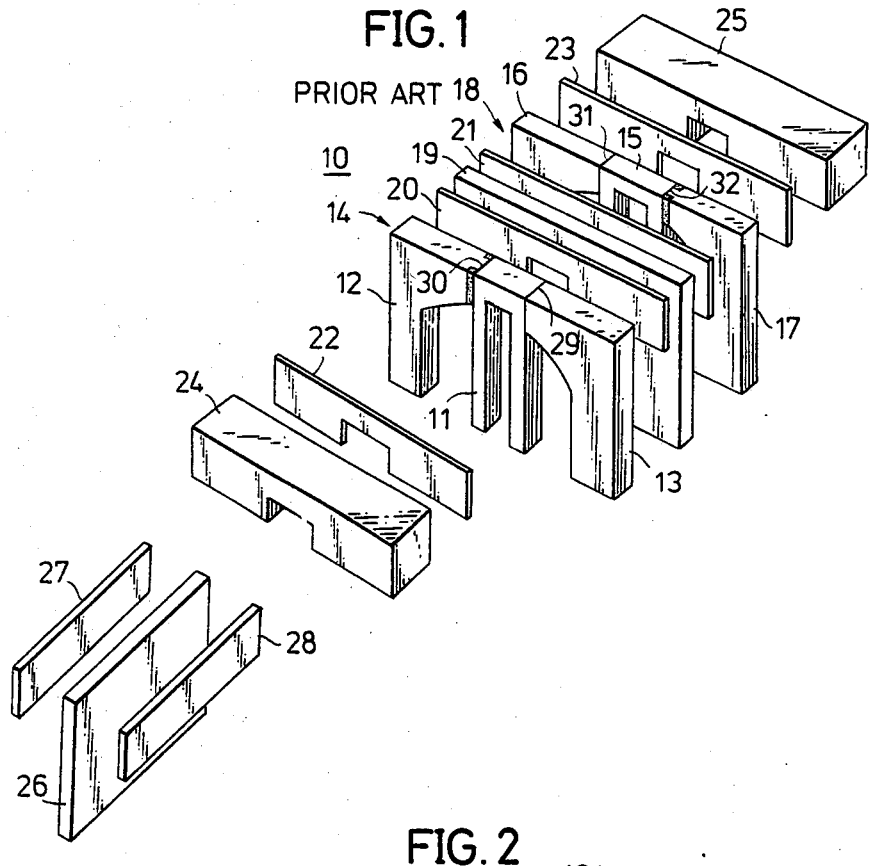
FIG. 1 is a disassembled perspective view showing a core-shield-spacer assembly during a production process of one example of the conventional method of producing the magnetic head.

In FIG. 1, a first core assembly 14 is prepared by connecting right and left cores 13 and 12 on a central core 11, and a second core assembly 18 is prepared by connecting right and left cores 17 and 16 on a central core 15. A core-shield-spacer assembly 10 is formed by connecting the first and second core assemblies 14 and 18 with a channel spacer 20, a channel shield 19 and a channel spacer 21 interposed therebetween, connecting blocks 24 and 25 on both sides of the connected core assemblies with respective spacers 22 and 23 interposed therebetween, and fitting a center shield 26 and spacers 27 and 28 in the central cores 11 and 15 from below. The core-shield-spacer assembly 10 comprises a write gap 29 and a read gap 30 of a first channel, and a write gap 31 and a read gap 32 of a second channel.

Figure 2:
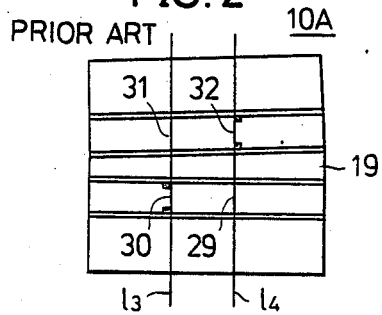
FIG. 2 is a diagram for explaining an example of a case where the positional accuracy of gaps is deteriorated due to dimensional accuracy of a channel shield in the conventional method described with reference to FIG. 1.

According to the core-shield-spacer assembly 10, the distance between the write gap 29 and the read gap 30 of the first channel and the degree of parallelism of the write and read gaps 29 and 30 can be accurately determined. However, the core assemblies which respectively form the gaps of the first and second channels are independent bodies, and the channel shield 19 and the channel spacers 20 and 21 are interposed between the first and second core assemblies 14 and 18. Hence, the relative positional relationship of the first and second core assemblies 14 and 18 easily becomes inconsistent and the dimensional accuracy becomes poor. For example, in a case where the degree of parallelism of the channel shield 19 is poor, a core-shield-spacer assembly 10A becomes as shown in FIG. 2, and there are problems in that the gaps 31 and 32 of the second core assembly 18 become inclined to respective lines $l_3$ and $l_4$ and the accuracy of the azimuth angle becomes poor. In other words, the core-shield-spacer assembly 10 does not satisfy the conditions (3), (4) and (5) out of the conditions (1) through (5) described before.

Figure 3:
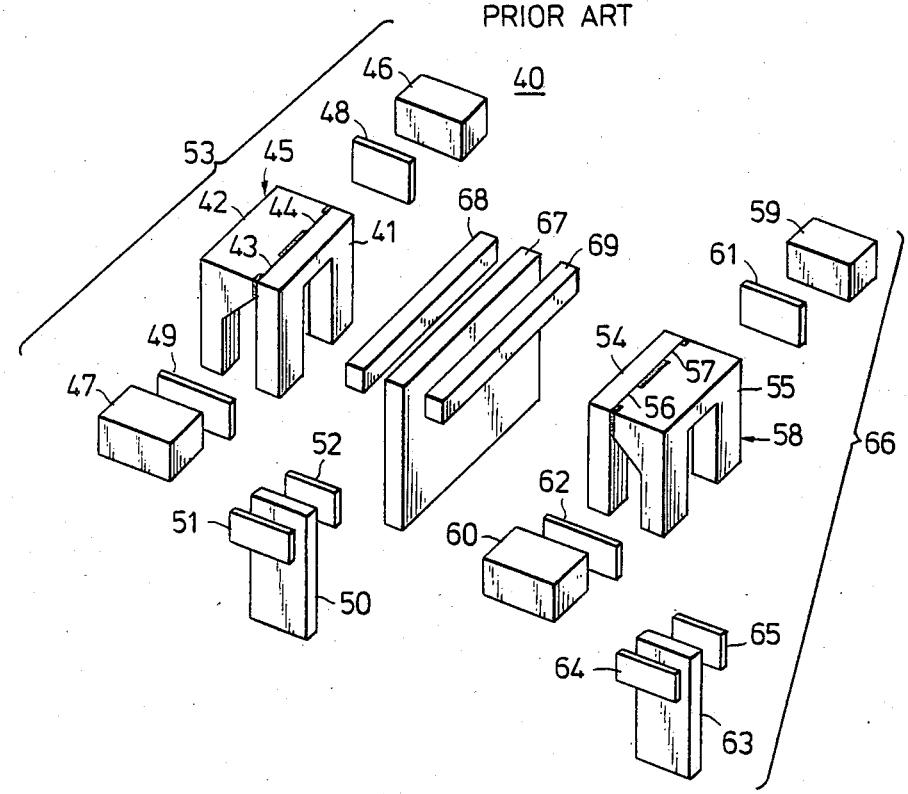
FIG. 3 is a disassembled perspective view showing a core-shield-spacer assembly during a production process of another example of the conventional method of producing the magnetic head.

On the other hand, in FIG. 3, a left core-shield-spacer assembly 53 is prepared by connecting cores 41 and 42 to constitute a left core assembly 45 formed with a read gap 43 and a write gap 44, connecting blocks 46 and 47 on both sides of the left core assembly 45 with respective spacers 48 and 49 interposed therebetween, and fitting a channel shield 50 and spacers 51 and 52 in the cores 41 and 42 from below. Similarly, a right core-shield-spacer assembly 66 is prepared by connecting cores 54 and 55 to constitute a right core assembly 58 formed with a write gap 56 and a read gap 57, connecting blocks 59 and 60 on both sides of the right core assembly 58 with respective spacers 61 and 62 interposed therebetween, and fitting a channel shield 63 and spacers 64 and 65 in the cores 54 and 55 from below. A core-shield-spacer assembly 40 is formed by connecting the right and left core-shield-spacer assemblies 66 and 53 with a center shield 67 and center spacers 68 and 69 interposed therebetween.

Figure 4:
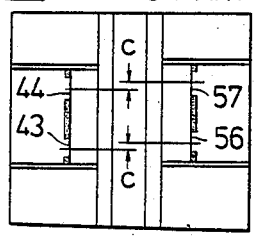
FIGS. 4 and 5 respectively are diagrams for explaining an example of a case where the positional accuracy of the gaps is deteriorated due to the fact that right and left core-shield-spacer assemblies are independent bodies and an example of a case where the positional accuracy of the gaps is deteriorated due to the dimensional accuracy of a center shield.
Figure 5:
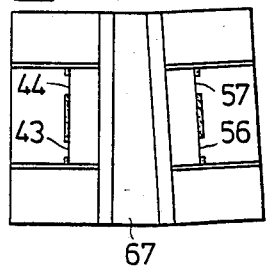

According to the core-shield-spacer assembly 40, the gaps 43 and 44 formed in the core assembly 45 and the gaps 56 and 57 formed in the core assembly 58 are respectively aligned. However, since the center shield 67 and the center spacers 68 and 69 are interposed between the core assemblies 45 and 58, it is difficult to accurately determine the distance between the gaps 43 and 56 and the distance between the gaps 44 and 57. In addition, when there is an inconsistency in connecting the right and left core-shield-spacer assemblies 66 and 53, a core-shield-spacer assembly 40A becomes as shown in FIG. 4. In this case, the centers of the write gap 56 and the read gap 43 constituting a pair do not coincide, and the centers of the write gap 44 and the read gap 57 constituting a pair do not coincide. In other words, there is an error c between the centers of each pair of gaps, and the alignment of the gaps is poor. On the other hand, when the degree of parallelism of the center shield 67 is poor, a core-shield-spacer assembly 40B becomes as shown in FIG. 5. In this case, the degree of parallelism of the write gap 56 and the read gap 43 constituting a pair and the degree of parallelism of the write gap 44 and the read gap 57 constituting a pair become poor. Therefore, according to the core-shield-spacer assembly 40, the gaps within each of the right and left core-shield-spacer assemblies 66 and 53 are formed with a high accuracy, but none of the conditions (1) through (5) described before can be satisfied when the right and left core-shield-spacer assemblies 66 and 53 are connected.

Next, description will be given with respect to an embodiment of the method of producing the magnetic head according to the present invention.

Figure 6:
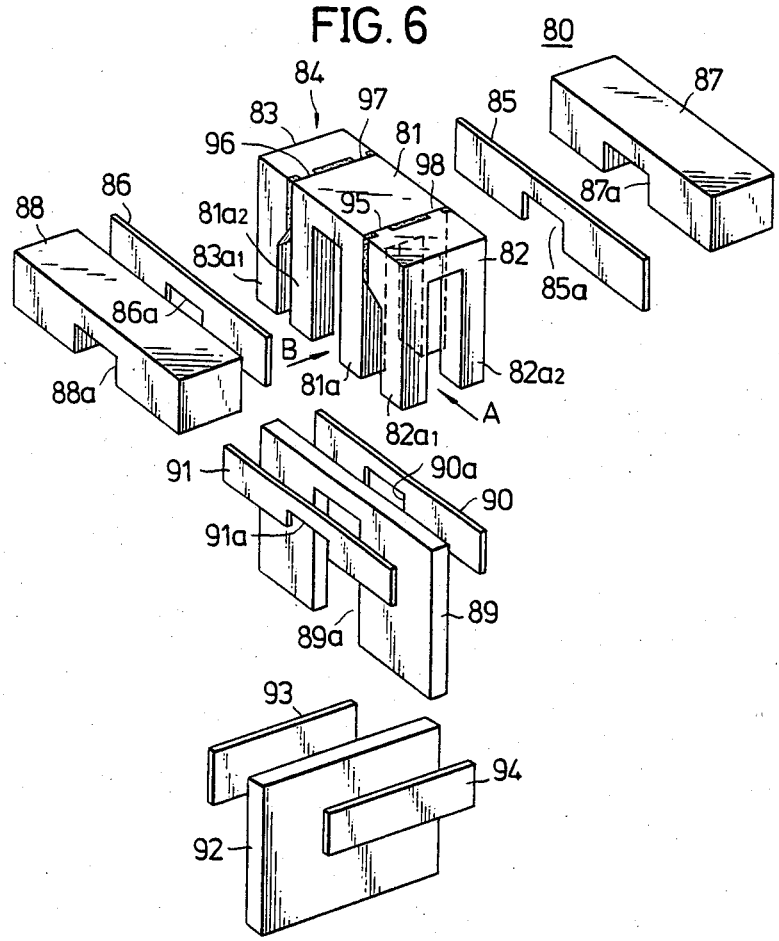
FIG. 6 is a disassembled perspective view for explaining a process of assembling a core-shield-spacer assembly during a production process of an embodiment of the method of producing the magnetic head according to the present invention.
Figure 7:
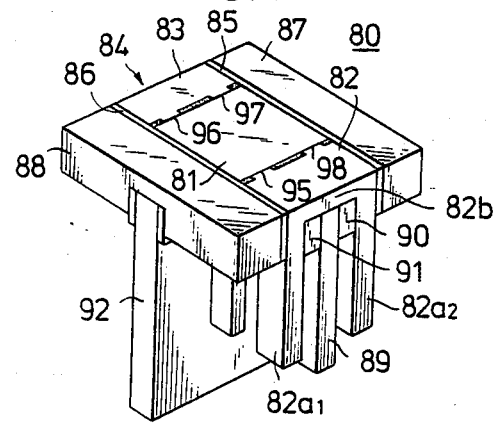
FIGS. 7 and 8 are a perspective view and a plan view respectively showing the core-shield-spacer assembly.
Figure 8:
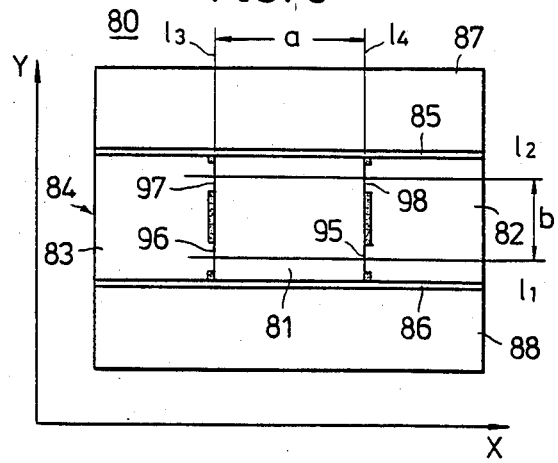
Figure 9:
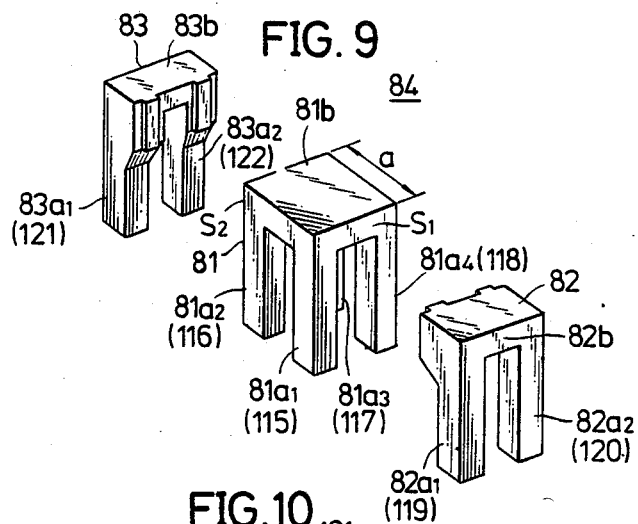
FIG. 9 is a disassembled perspective view showing a core assembly shown in FIG. 6.

A single core assembly 84 shown in FIGS. 6 through 8 is formed from a reference core block 81 and first and second side core blocks 82 and 83 shown in FIG. 9. In FIG. 9, the first side core block 82 is connected to the right side surface of the reference core block 81 with a glass gap spacer (not shown) having a predetermined thickness interposed therebetween, and the second side core block 83 is connected to the left side surface of the reference core block 81 with a glass gap spacer (not shown) having a predetermined thickness interposed therebetween, by melting the glass gap spacers (that is, by glass bonding). The reference core block 81 is formed with a high accuracy so that right and left surfaces S1 and S2 thereof are perfectly parallel to each other and a distance between the right and left surfaces S1 and S2 is set accurately to a value a.

A core-shield-spacer assembly 80 shown in FIGS. 6 through 9 is formed by fixing blocks 87 and 88 on both sides of the core assembly 84 by an adhesive agent with respective spacers 85 and 86 interposed therebetween, and a channel shield 89 and channel spacers 90 and 91 and a center shield 92 and center spacers 93 and 94 are fixedly fitted in the core assembly 84 from below in a cross pattern.

The core-shield-spacer assembly 80 comprises a write gap 95 and a read gap 96 which constitute a first pair and a write gap 97 and a read gap 98 which constitute a second pair. The write gap 95 and the read gap 98 are formed between the reference core block 81 and the first side core block 82, and the read gap 96 and the write gap 97 are formed between the reference core block 81 and the second side core block 83. In other words, all of the gaps 95 through 98 are formed in the core assembly 84. Accordingly, a distance between the gaps in each pair of gaps is determined at a stage of the core assembly 84, and this distance is unaffected by the shields 89 and 92 and the spacers 90, 91, 93 and 94. Each of the core blocks 81, 82 and 83 are made of ferrite, and thus, the blocks 87 and 88, the channel shield 89 and the center shield 92 are also made of ferrite. The spacers 85, 86, 90, 91, 93 and 94 are made of ceramics.

Figure 10:
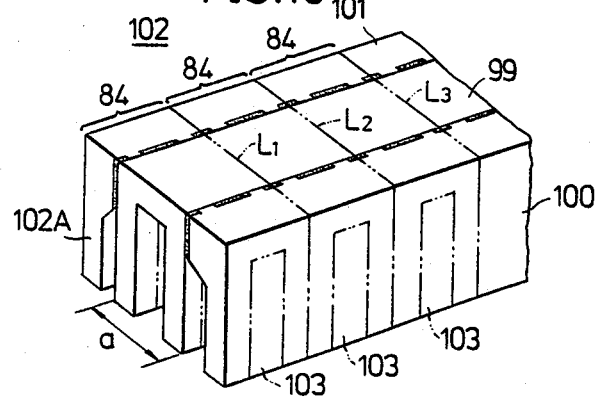
FIG. 10 is a diagram for explaining a process of producing the core assembly shown in FIG. 6.

As shown in FIG. 10, the core assembly 84 is formed by connecting a first side core block 100 and a second side core block 101 on right and left side surfaces of a reference core block 99 which has a generally inverted U-shaped cross section by glass bonding so as to obtain a core block assembly 102, cutting (slicing) the core block assembly 102 along lines L1, L2 and L3 so as to obtain semi-completed core assemblies 102A, and thereafter cutting and removing portions of the semi-completed core assemblies 102A indicated by two-dot chain lines.

The reference core block 99 is accurately finished so that the right and left side surface thereof are prefectly parallel to each other and the distance between the right and left side surfaces is accurately equal to the value a.

Surfaces of the first and second side core blocks 100 and 101 which are connected to the reference core block 99 are formed with grooves for restricting the track width of the write the read gaps. The first and second side core blocks 100 and 101 are connected to the reference core block 99 by glass bonding with the grooves accurately positioned by use of a microscope or the like. The grooves are filled with glass.

Accordingly, in the core-shield-spacer assembly 80 shown in FIGS. 6 and 7, the centers of the write gap 95 and the read gap 96 which constitute the first pair accurately coincide with a line $l_1$. Similarly, the centers of the write gap 97 and the read gap 98 which constitute the second pair accurately coincide with a line $l_2$. Thus, the centers of the gaps in each of the first and second pairs of gaps are aligned with a high accuracy. The lines $l_1$ and $l_2$ are parallel to a tape transporting direction in which a magnetic tape is transported. In addition, the distance between the gaps 96 and 97 and the distance between the gaps 95 and 98 are accurately equal to the value a, and the gap separation a is accurately determined. Furthermore, a distance between two mutually adjacent channels, that is, the track pitch, is accurately determined and is equal to a value b. The gaps 96 and 97 of the mutually adjacent channels and the gaps 95 and 98 of the mutually adjacent channels are positioned on the respective lines $l_3$ and $l_4$ and are parallel to the respective lines $l_3$ and $l_4$. For this reason, it is possible to obtain accurate azimuth angles of 0°. Moreover, the gaps 96 and 95 constituting the first pair are accurately parallel to each other and the gaps 97 and 98 constituting the second pair are accurately parallel to each other, and the degree of parallelism of the gaps constituting each pair is highly accurate.

Therefore, a magnetic head 110 shown in FIGS. 13 and 14 which is completed by grinding the core-shield-spacer assembly 80 as will be described later satisfies all of the conditions (1) through (5) described before.

In the core-shield-spacer assembly 80, the reference core block 81 comprises four legs $81a1$ through $81a4$. The first side core block 82 comprises two legs $82a1$ and $82a2$, and the second side core block 83 comprises two legs $83a1$ and $83a2$. The core-shield-spacer assembly 80 also comprises grooves extending in directions A and B between the legs so that the shields and spacers can be fitted therein. The channel shield 89, the blocks 87 and 88, the spacers 85, 86, 90 and 91 are respectively formed with cutouts $89a$, $87a$, $88a$, $85a$, $86a$, $90a$ and $91a$ for receiving the center shield 92 and the spacers 93 and 94.

Next, as shown in FIG. 11, a coil 104 is fitted on each of the legs $82a1$, $82a2$, $83a1$ and $83a2$ of the side core blocks 82 and 83. A back bar 105 is fixed across the leg $81a1$ of the reference core block 81 and the leg $82a1$ of the side core block 82, across the legs $81a2$ and $83a1$, across the legs $81a3$ and $83a2$ and also across the legs $81a4$ and $82a2$. A terminal substrate 106 is fixedly fitted on the center shield 92, and terminal portions of each coil 104 are soldered to corresponding terminals $106a$ of the terminal substrate 106. The core-shield-spacer assembly 80 which is mounted with the above parts is fixedly fitted in a holder 107 with an upper portion thereof exposed to the outside.

Finally, the exposed upper portion of the core-shield-spacer assembly 80 is ground to positions of lines 108 and 109 shown in FIGS. 12A and 12B so that the upper portion has a shape defined by the lines 108 and 109. By this grinding process, the channel shield 89, the center shield 92, and the spacers 90, 91, 93 and 94 become exposed, and a depth of each of the gaps 95 through 98 becomes equal to a value d.

As a result, the magnetic head 110 shown in FIGS. 13 and 14 is obtained. In the magnetic head 110, the gaps 95 and 96 of a write head 111 and a read head 112 of the first channel and the gaps 97 and 98 of a write head 113 and a read head 114 of the second channel satisfy the conditions (1) through (5) described before. The write head 111 and the read head 114 are isolated from the read head 112 and the write head 113 by the center shield 92. The write head 111 and the read head 112 of the first channel and the write head 113 and the read head 114 of the second channel are isolated by the channel shield 89.

Since each core of the magnetic head 110 is made of ferrite and the gaps 95 through 98 are formed with a high accuracy, it is possible to obtain a high recording density of 12,000 FCI (flux change per inch), a high transfer of 200 IPS (inch per second), and a narrow track width of 0.2 to 0.15 mm. Thus, the resistivity of the magnetic head 110 against frictional wear is improved, and the reliability of the data is improved.

In addition, the core-shield-spacer assembly 80 shown in FIGS. 6 and 9 comprises the reference core block 81 which has a rectangular top plate portion 81b and the rectangular column-shaped legs 81a1 through 81a4 which extend downwardly from the four corners of the top plate portion 81b. The top plate portion 81b is removed by the grinding process described before. The legs 81a1 through 81a4 become independent due to the removal of the top plate portion 81b. In the completed magnetic head 110, the legs 81a1 through 81a4 respectively constitute core halves 115 through 118 of the heads 111 through 114 closer to the center of the completed magnetic head 110.

The first side core block 82 comprises the rectangular column-shaped legs 82a1 and 82a2 and a connecting portion 82b which connects to the legs 82a1 and 82a2, and has a generally inverted U-shape. Similarly, the second side core block 83 comprises the rectangular column-shaped legs 83a1 and 83a2 and a connecting portion 83b, and has a generally inverted U-shape. The connecting portions 82b and 83b are removed by the grinding process described before. The legs 82a1 and 82a2 become independent due to the removal of the connecting portion 82b, and the legs 83a1 and 83a2 become independent due to the removal of the connecting portion 83b. In the completed magnetic head 110, the legs 82a1, 83a1, 83a2 and 82a2 respectively constitute core halves 119 through 122 of the heads 111 through 114 further away from the center of the completed magnetic head.

The method of the present invention is not limited to the production of the magnetic head 110 having two channels, and may be applied to the production of special magnetic heads as will be described hereinafter.

Figure 15:
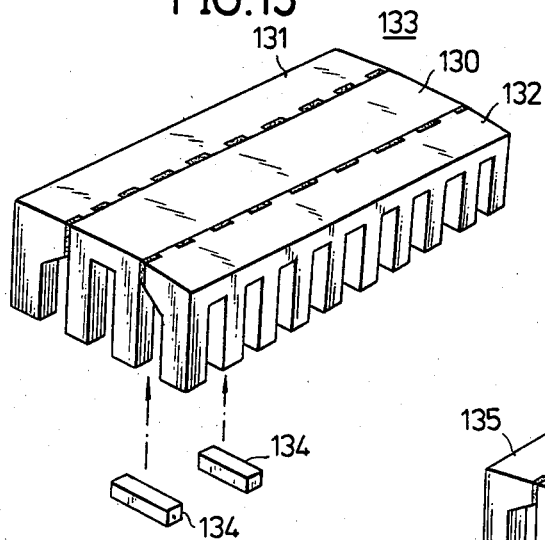
FIGS. 15 through 18 are perspective views respectively showing modifications of the core assembly obtained during a production process of the method of producing the magnetic head according to the present invention.

A multi-channel magnetic head is produced by use of a core assembly 133 shown in FIG. 15. The core assembly 133 is formed by connecting right and left core blocks 132 and 131 on both sides of an elongated reference core block 130. A back bar 134 is fixed not to the side surfaces of the legs of each core but to the bottom surfaces of the legs of each core.

Figure 16:
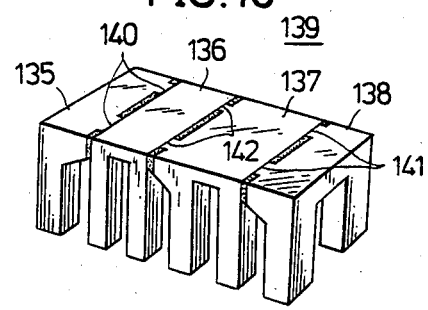

A triple gap magnetic head is produced by use of a core assembly 139 shown in FIG. 16. The core assembly 139 is formed by connecting four core blocks 135, 136, 137 and 138. Gaps on the right and left sides are used as write gaps 141 and 140 and gaps at the center are used as read gaps 142.

Figure 17:
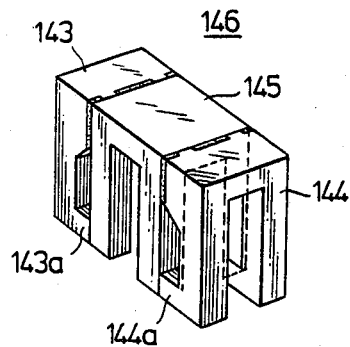

FIG. 17 shows a core assembly 146 which is formed by connecting right and left core blocks 144 and 143 to a reference core block 145. The right core block 144 integrally comprises back bars 144a, and the left core block 143 integrally comprises back bars 143a. Coils are wound afterwards.

Figure 18:
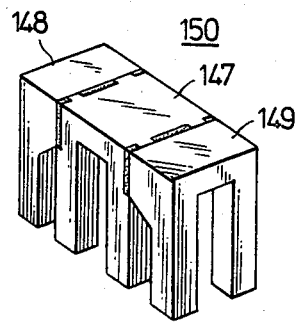

FIG. 18 shows a core assembly 150 which is formed by connecting right and left core blocks 149 and 148 on a reference core block 147. The reference core block 147 has grooves formed on right and left side surfaces thereof, and the right and left core blocks 149 and 148 are connected to the respective grooved side surfaces of the reference core block 147.

By using the core assemblies 133, 139, 146 and 150, it is possible to produce magnetic heads in which the gaps are determined accurately as in the embodiment described before.

FIGS. 19 and 20 show a magnetic head which is produced by another embodiment of the method of producing the magnetic head according to the present invention. In FIGS. 19 and 20, those parts which are substantially the same as those corresponding parts in FIGS. 6 through 14 are designated by the same reference numerals, and description thereof will be omitted.

A magnetic head 160 has a center shield 164 which is formed by sandwiching an all copper plate 161 by ferrite plates 162 and 163. The ferrite plates 162 and 163 function similarly to the center shield 92 shown in FIG. 13, and the copper plate 161 has the function of converting the magnetic fluxes from the write heads 111 and 113 to eddy currents and eliminating them. The copper plate 161 is especially effective when signals to be recorded by the write heads 111 and 113 have high frequencies over several MHz.

The center shield 164 has a higher shielding effect compared to the center shield 92 described before. For this reason, it is possible to effectively prevent the magnetic fluxes generated from the write heads 111 and 113 from affecting the read heads 112 and 114 which respectively constitute pairs with the write heads 111 and 113 (so-called feedthrough).

It is possible to obtain similar effects by using in place of the copper plate 161 a plate made of a material having a low electrical resistance such as aluminum and brass.

The magnetic head 160 is provided with a generally C-shaped ferrite block 165 which surrounds the coils 104 of the write head 111 and the read head 114, and a C-shaped ferrite block 166 which surrounds the coils 104 of the read head 112 and the write head 113. These ferrite blocks 165 and 166 are provided between the magnetic head 160 and a holder 167.

The ferrite blocks 165 and 166 effectively prevent the magnetic fluxes generated from the write heads 111 and 113 from extending to the outside and accordingly prevent the so-called feedthrough.

Accordingly, the magnetic head 160 is designed to effectively prevent the feedthrough by the provision of the center shield 164 and the ferrite blocks 165 and 166. Thus, the read heads 112 and 114 can read pre-recorded signals from a magnetic tape 170 with a satisfactory signal-to-noise ratio.

A head surface of the magnetic head 160 is formed by a grinding process as in the case of the magnetic head described before. But in the present embodiment, the grinding process is performed so that approximately semi-cylindrical tape guide portions 168 and 169 are formed on both sides of the magnetic head 160 along the tape transporting direction. As shown in FIG. 19, the tape guide portions 168 and 169 respectively guide the magnetic tape 170 at an entrance side and an exit side along the tape transporting direction. Consequently, an angle with which the magnetic tape 170 is wrapped over the gaps 95 through 98 is determined by the magnetic head 160 itself and is unaffected by the accuracy with which the magnetic head 160 is mounted on a cassette tape streaming device. The tape guide portions 168 and 169 are shaped so as to obtain an optimum wrapping angle.

Therefore, it is possible to obtain a satisfactory contact between the gaps of each head and the magnetic tape, and write-in and read-out on and from the magnetic tape can be carried out satisfactorily.

Further, the present invention is not limited to these embodiments, but various variations and modifications may be made without departing from the scope of the present invention.

What is claimed is:

1. A method of producing a magnetic head for a plurality of channels, said magnetic head comprising a plurality of head pairs each of which corresponds to one of said plurality of channels and comprises a write head and a read head aligned in a tape transporting direction in which a magnetic tape is transported, said plurality of head pairs being aligned in a direction perpendicular to the tape transporting direction, a write head and a read head of each head pair being isolated by a center shield and center spacers, write heads and read heads of two mutually adjacent head pairs being isolated by a channel shield and channel spacers, said method comprising the steps of:

forming a reference core block having right and left side surfaces which are finished with a high accuracy so that a distance between said right and left side surfaces is accurately equal to a predetermined value and a degree of parallelism of said right and left side surfaces is accurate, said reference core block integrally comprising legs which are used to finally form respective one core halves of a write head and a read head of each head pair;

forming a core assembly by connecting a first side core block and a second side core block to said right and left side surfaces of said reference core block, each of said first and second side core blocks integrally comprising legs which are used to finally form respective other core halves of the write head and the read head of each head pair, said core assembly comprising gaps of the write heads and the read heads of said plurality of head pairs at said right and left side surfaces of said reference core block;

forming a core-shield-spacer assembly by fitting between the cores of said core assembly said center shield and said center spacers so as to isolate the write head and the read head of each head pair and said channel shield and said channel spacers so as to isolate the write heads and the read heads of the two mutually adjacent head pairs;

forming a head surface by grinding an upper surface of said core-shield-spacer assembly until the legs of said reference core block and the legs of said first and second core blocks become independent and said center shield, said center spacers, said channel shield and said channel spacers become exposed; and grinding said core-shield-spacer assembly to form an approximately semi-cylindrical tape guide portion at each end of said head surface along the tape transporting direction.

2. A method of producing a magnetic head as claimed in claim 1 in which said reference core block comprises a top plate portion with said legs extending downwardly from corners thereof, said step of forming the head surface being performed until said top plate portion is removed.

3. A method of producing a magnetic head as claimed in claim 1 in which said first core block comprises a first connecting portion connecting the legs thereof and said second core block comprises a second connecting portion connecting the legs thereof, said step of forming the head surface being performed until said first and second connecting portions are removed.

4. A method of producing a magnetic head as claimed in claim 1 in which said step of forming said core assembly comprises the substeps of:

forming an elongated core block assembly by connecting first and second elongated core blocks on both side surfaces of an elongated reference core block, said elongated reference core block having a generally inverted U-shape cross section and having the side surfaces thereof finished with a high accuracy;

cutting said elongated core block assembly into a predetermined length so as to obtain a semi-completed core assembly; and forming the legs of said reference core block and the legs of said first and second side core blocks by machining said semi-completed core assembly.

5. A method of producing a magnetic head as claimed in claim 1 in which said step of forming the core-shield-spacer assembly comprises a substep of fitting said center shield in said core assembly, said center shield comprising a copper plate sandwiched by a pair of ferrite plates.

6. A method of producing a magnetic head as claimed in claim 1 which further comprises the steps of fitting said core-shield-spacer assembly in a holder, and mounting a pair of generally C-shaped ferrite blocks between said core-shield-spacer assembly and said holder so that one of said generally C-shaped ferrite blocks surrounds a coil of one of the heads in each head pair and the other of said generally C-shaped ferrite blocks surrounds a coil of the other of the heads in each head pair.

* * * * *